United States Patent [19]

Anderson et al.

[11] 4,216,417
[45] Aug. 5, 1980

[54] TRANSIT VEHICLE MOTOR OPERATION CONTROL APPARATUS AND METHOD

[75] Inventors: Larry W. Anderson, Pittsburgh; James H. Franz, Jr., Murrysville; Thomas C. Matty, North Huntingdon Township, Westmoreland County, all of Pa.

[73] Assignee: Westinghouse Electric Corp., Pittsburgh, Pa.

[21] Appl. No.: 898,345

[22] Filed: Apr. 21, 1978

Related U.S. Application Data

[63] Continuation of Ser. No. 709,686, Jul. 29, 1976, abandoned.

[51] Int. Cl.² .......................... H02P 1/00; H02P 3/00; H02P 7/00
[52] U.S. Cl. .................................... 318/274; 318/341; 318/345 E; 318/375; 318/395; 318/397
[58] Field of Search ............... 318/273, 274, 276, 368, 318/369, 375, 376, 394, 395, 397, 400, 428, 503, 504, 512, 528, 531, 341, 345 E

[56] References Cited

U.S. PATENT DOCUMENTS 3,581,172   5/1971   Tsuboi et al. .................. 318/274
3,621,354   11/1971  Fawcett et al. ................ 318/341

OTHER PUBLICATIONS

Fallside et al., "Direct Digital Control of Thyristor Amplifiers", *Control and Science Proceedings of IEE*, 5/1969, pp. 873–878.
Jackson et al., "Direct Digital Control of Thyristor Converters", *IFAC Symposium on Control and Power Electronics and Electrical Drives*, 10/1974, pp. 431–441.

Primary Examiner—J. V. Truhe
Assistant Examiner—Eugene S. Indyk
Attorney, Agent, or Firm—R. G. Brodahl

[57] ABSTRACT

There is disclosed a programmed microprocessor control apparatus and method for a transit vehicle electric motor through operation of a chopper apparatus. The microprocessor program controls the motor braking effort in brake mode through operation of the brake resistors and the motor tractive effort in the power mode through the motor field shunt operation.

12 Claims, 10 Drawing Figures

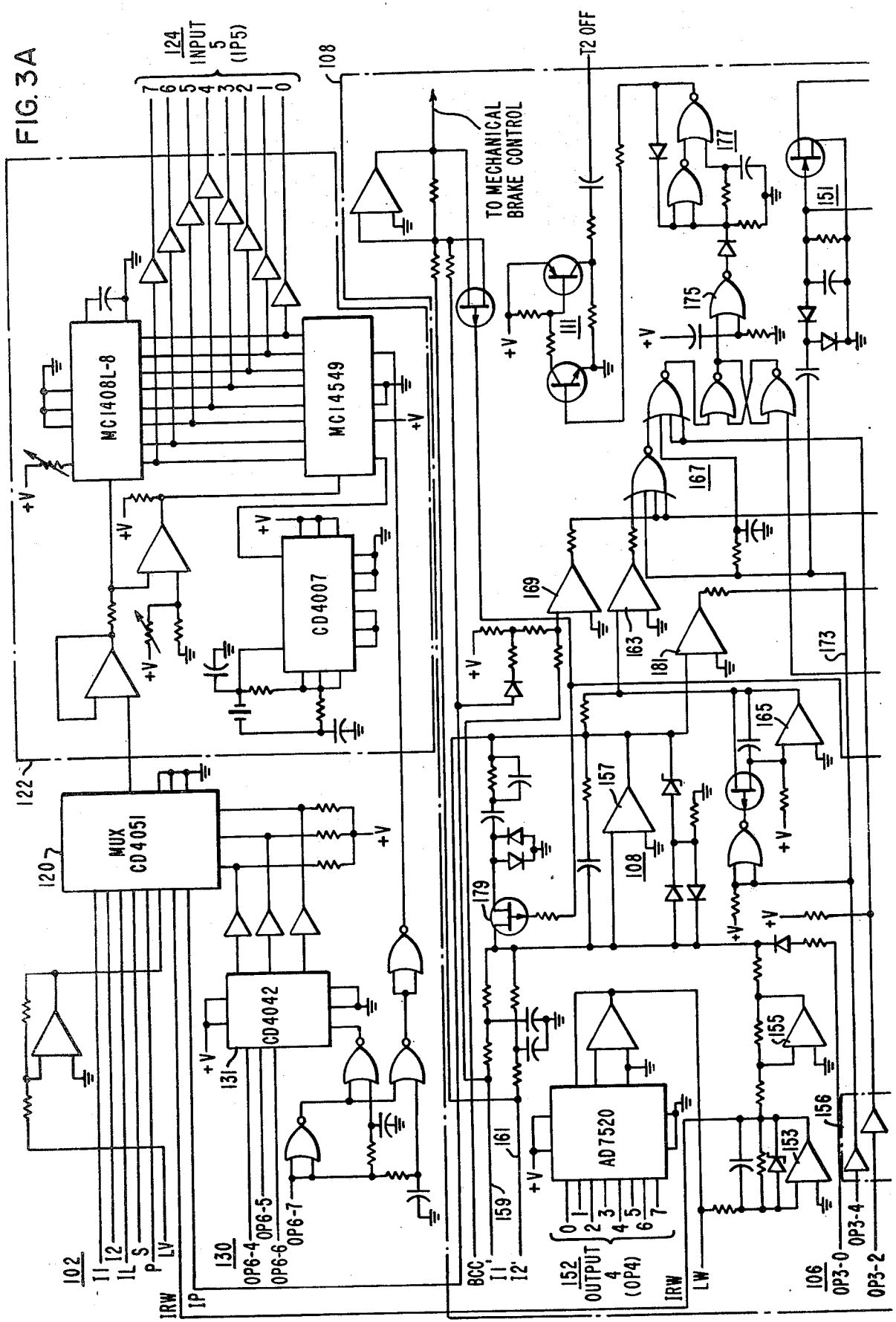

TRANSIT VEHICLE MOTOR OPERATION CONTROL APPARATUS AND METHOD

This is a continuation of application Ser. No. 709,686 filed July 29, 1976, now abandoned.

CROSS REFERENCE TO RELATED APPLICATIONS

The present application is related to the following concurrently filed patent applications which are assigned to the same assignee as the present application, the respective disclosures of which are incorporated herein by reference:

Ser. No. 706,687, which was filed on July 29, 1976 by J. H. Franz and entitled Transit Vehicle Chopper Control Apparatus And Method; and now issued as U.S. Pat. No. 4,090,115

Ser. No. 709,821, which was filed on July 29, 1976 by T. C. Matty and entitled Transit Vehicle Motor Effort Control Apparatus And Method;

Ser. No. 709,685, which was filed on July 29, 1976 by L. W. Anderson and J. H. Franz and entitled Transit Vehicle Generated Voltage Control Apparatus And Method; and now issued as U.S. Pat. No. 4,123,693; and Ser. No. 709,684, which was filed on July 29, 1976 by T. C. Matty and J. H. Franz and entitled Transit Vehicle Electrical Brake Control Apparatus And Method and now issued as U.S. Pat. No. 4,095,153.

BACKGROUND OF THE INVENTION

The present invention relates to the application of thyristor chopper apparatus for determining the propulsion power and electric brake operations of a transit vehicle having series propulsion motors, and more particularly to control apparatus including a microprocessor that is programmed for the desired control of such thyristor chopper apparatus.

Direct current power has been supplied to the series propulsion motors of a transit vehicle with a thyristor chopper, such as disclosed in U.S. Pat. No. 3,530,503 of H. C. Appelo et al, for controlling the acceleration and speed of the vehicle by turning the propulsion motor current ON and OFF in a predetermined pattern. The thyristor chopper can provide either regenerative braking or dynamic braking when braking is desired.

In an article entitled Automatic Train Control Concepts Are Implemented By Modern Equipment published in the Westinghouse Engineer for September 1972 at pages 145 to 151, and in an article entitled "Propulsion Control For Passenger Trains Provides High Speed Service" published in the Westinghouse Engineer for September 1970 at pages 143 to 149, there is described the operation of the P signal for controlling all powered vehicles in a train to contribute the same amount of propulsion or braking effort.

In an article entitled Alternative Systems For Rapid Transit Propulsion And Electrical Braking, published in the Westinghouse Engineer for March, 1973, at pages 34–41, there is described a thyristor chopper control system for propulsion and electrical braking of transit vehicles. The thyristor chopper provides a propulsion system that is superior in smoothness and ease of maintaining a given speed, which latter feature is desired for automatic train control. Moreover, the thyristor system makes regenerative braking practical because the response is fast enough to continuously match regenerated voltage to line voltage, and that matching prevents excursions in braking current and torque due to sudden transients in line voltage. The reduction in power consumption that results from regenerative braking can be significant, but another advantage is in relation to minimizing heat input to tunnels otherwise caused by dynamic braking.

The use of presently available microprocessor devices, such as the Intel 8080 family of devices, is described in a published article entitled "Microprocessors—Designers Gain New Freedom As Options Multiply" in Electronics Magazine for April 15, 1976 at page 78 and in a published article entitled "Is There A High-Level Language In Your Microcomputer's Future?" in EDN Magazine for May 20, 1976 at page 62.

SUMMARY OF THE INVENTION

A programmed microprocessor apparatus establishes at least one limit for each of a vehicle speed signal for controlling the operation of the braking resistors to determine the motor electric braking effort in the brake mode and the chopper phase angle signal for controlling the field shunt operation of the motor to determine the motor tractive effort in the power mode for more than one program cycle.

BRIEF DESCRIPTION OF THE DRAWINGS

FIGS. 3A and 3B illustrate schematically the provided interface of the present control apparatus;

DESCRIPTION OF A PREFERRED EMBODIMENT

Figure 1:
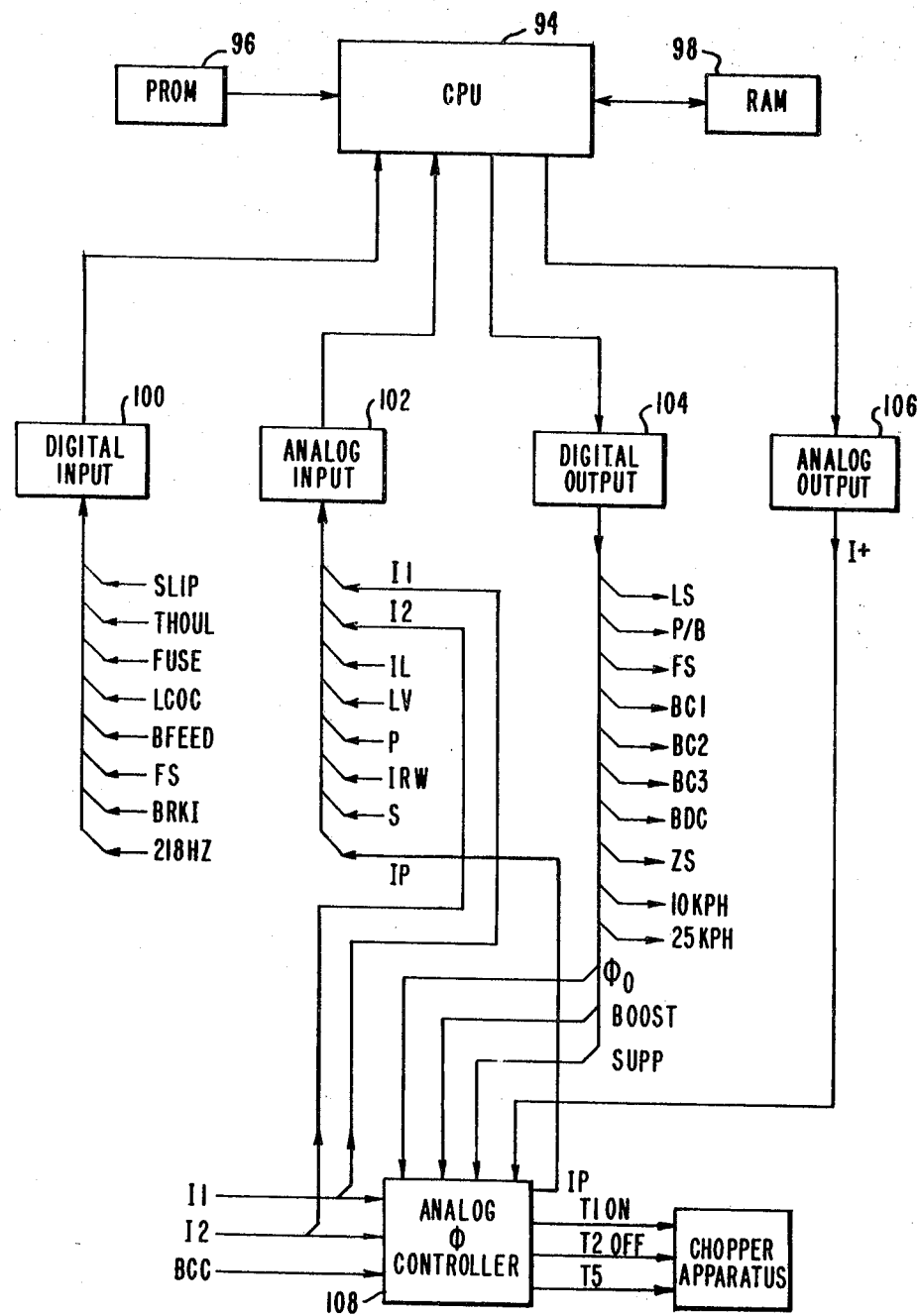
FIG. 1 is a functional showing of the present control apparatus in relation to the input signals and the output signals operative with the control apparatus.

In FIG. 1 there is shown a functional illustration of the present control apparatus in relation to the input signals and the output signals operative therewith, and including a CPU microprocessor 94 operative with a PROM programmable memory 96 and a scratch pad RAM random access memory 98 used for intermediate storage. The application program, in accordance with the program listing included in the Appendix, is stored in the programmable memory 96. The microprocessor 94 can be an INTEL 8080, the random access memory 98 can be an INTEL 8101, and the programmable memory 96 can be an INTEL 1702 programmable read only memory, which items are currently available in the open marketplace. There are four illustrated categories of input and output signals relative to the processor controlled operation of a transit vehicle. The digital input signals are supplied through digital input 100 from the transit vehicle and include the slip slide signal SLIP, the thyristor temperature sensor thermal overload signal THOUL, the effective value of the line filter capacitor as indicated by the fuse counter signal FUSE, the power circuit condition indication signal LCOC, the power and brake feedback signal BFEED, the field shunt feedback signal FS, the brake status signal BRKI and the clock signal 218 Hz. The analog input signals are supplied through analog input 102 and include the first propulsion motor leg current I1, the second propulsion motor leg current I2, the line current IL, the line voltage LV, the primary power request or brake request control signal P, the air pressure in the vehicle support bag members providing load weighed current request signal IRW, the analog phase signal IP and the vehicle actual speed signal S1. The digital output signals are supplied through digital output 104 to the controlled transit vehicle and include the line switch control signal LS, the power brake mode control signal P/B, the field shunt control signal FS, the first braking resistor control signal BC1, the second braking resistor control signal BC2, the third braking resistor control signal BC3, the zero ohm field shunt control signal BDC, the 10 kilometer per hour signal 10 KPH, the 25 kilometer per hour signal 25 KPH, the phase zero control signal $\phi_o$, the timing signal BOOST, the ON suppress control signal SUPP and the zero speed signal ZS. The analog output current request signal I+ is supplied through analog output 106 going to an analog phase controller 108 operative to supply the control signal ON to fire the chopper thyristor T1, the control signal OFF to fire the commutating chopper thyristor T3, the control signal T5 for the T5 thyristor in the propulsion motor control chopper apparatus and the analog phase indication signal IP going to analog input 102. The time period associated with turning the chopper ON and OFF is at a constant frequency of 218 Hz, that defines the clock time interval for the program cycle and for checking the process operation. During each of the 218 time intervals per second, the program cycle operates through the application program. It was necessary in the prior art for some of the input signals to be filtered to slow down the effects of noise transients and the like, but the computer program now samples the input signals 218 times every second, so if desired each signal can be checked during each program cycle and if the signal stays the same as it was before the proper response can be provided. By sampling all the input signals every program cycle and by addressing every output signal every program cycle, if noise transients are received, their effect can be minimized or eliminated. For the output signals, a correct output can be given 5 milliseconds later, faster than the power response time. For the input signals, digital filtering by comparison with old data can eliminate transient effects.

The train control system operative with each vehicle provides a P signal which selects a desired propulsion effort and this signal goes from 0 to 100 milliamps and establishes how much propulsion power or braking effort is desired by a particular train vehicle. The P signal is decoded to determine the proper motor current to generate the proper effort. In addition, there is a confirming signal, called the BRKI signal which determines when propulsion power and when braking effort is applied. The purpose of the BRKI signal is to control the power switching at the correct time to avoid one car braking while another car is in propulsion. Contact closures in the power circuitry are detected to establish that the power contacts have been made up properly and to readjust the settings in the logic. For instance, in field shunt operation, the amount of motor current is adjusted to keep from getting an undesired physical jerk of the vehicle. A failsafe reading of the P signal level is made such that, should the P signal be lost, the train control automatically goes into a brake mode. The present propulsion apparatus determines which switches to close and when to close them to modify the power circuit properly. A dynamic brake feedback signal is sent to the mechanical brake control for providing the blending of mechanical brake necessary to maintain the deceleration level required by the P signal. The P signal is in reality a vehicle acceleration or deceleration request.

The propulsion control apparatus provides output pulses to the main power thyristors to tell them when to turn ON and when to turn OFF. When a command signal is sensed, for example, if the vehicle is in propulsion or power mode and the command signal desires the vehicle to brake, the control apparatus senses any difference between the desired motor current and the actual motor current and ramps down the actual current as required. When the current gets down to a desired level, the control apparatus opens all the propulsion switches and reconnects for a brake operation, then ramps the motor current back up again to the level established by the desired brake operation.

Figure 2:
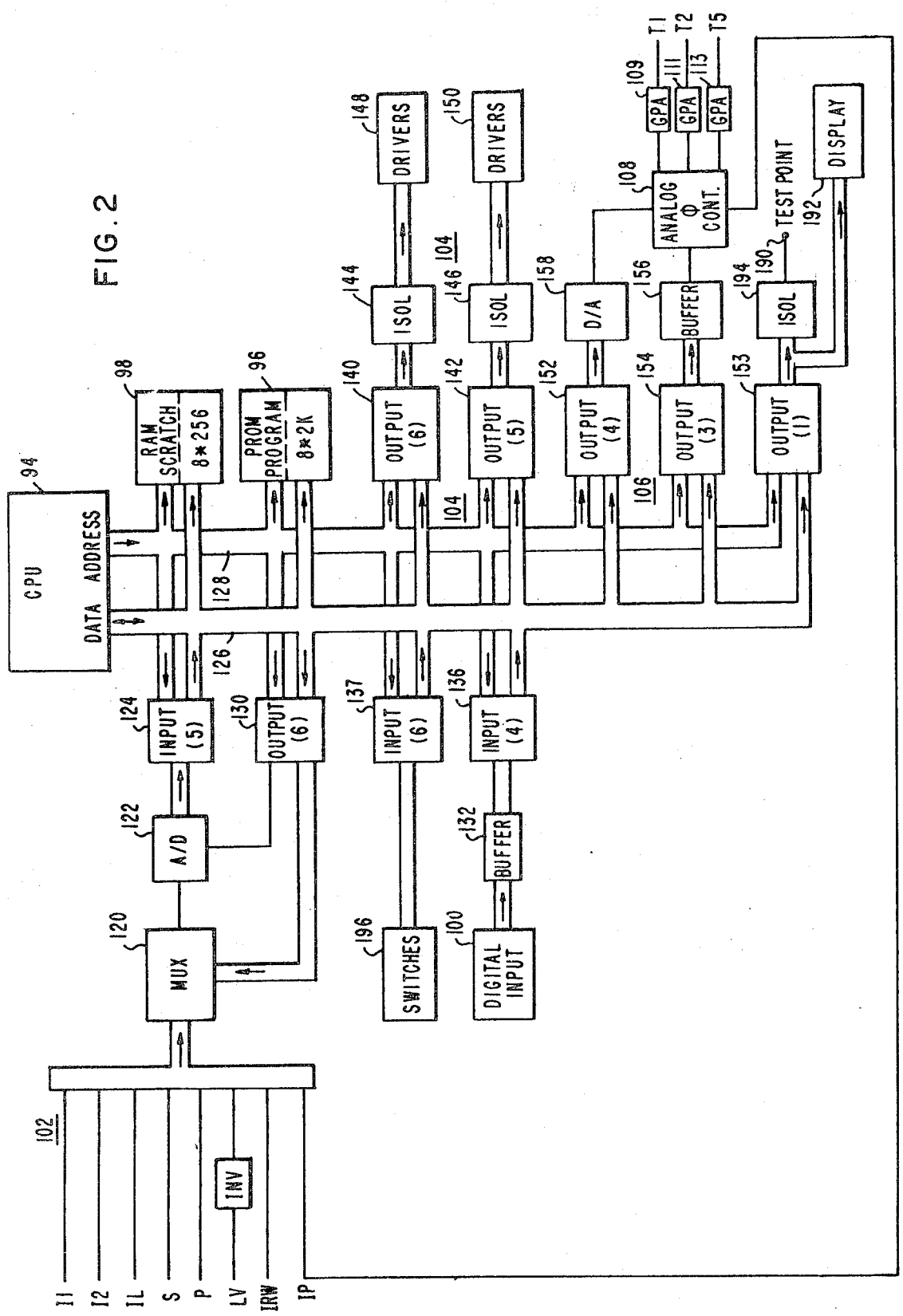
FIG. 2 illustrates the input signal operations and the output signal operations of the present control apparatus.

In FIG. 2 there is illustrated the input signal operations and the output signal operations of the present control apparatus, including the microprocessor 94 operative with its random access memory 98 and its programmable memory 96. The analog input signals are supplied through the analog input 102, through the multiplexer 120 and analog-to-digital converter 122 and input port 124 of the microprocessor 94 operative with a data bus 126 and address bus 128. The address bus 128 and data bus 126 are operative through an output port 130 to control the multiplexer 120 and the analog-to-digital converter 122. The digital input signals are supplied through the digital input 100 operating through buffer 132 with the input port 136 operative with the data bus 126 and the address bus 128. The digital output signals are supplied through digital output 104 including output ports 140 and 142 and respective isolation circuits 144 and 146 with drivers 148 and 150 in relation to the data bus 126 and the address bus 128. The analog output 106 is operative through output ports 152 and 154 through a buffer 156 and a digital-to-analog converter 158 with the analog phase controller 108.

The central processor 94 addresses a particular input port or output port or memory location and then transmits data to, or receives data from, that location on that data bus 126. For example, the central processor 94 can address an input port, such as input port 124 for the analog-to-digital converter 122 and the multiplexer 120. First it presents data to output 130 to tell the multiplexer 120 which analog circuit input signal is desired. Each analog signal has some sort of buffering, such as a differential amplifier or a low pass filter. When the particular input is addressed, the analog-to-digital converter 122 cycles for converting that data. The digital feedback signals from the digital feedback 100 come in and can be read whenever desired. A monitor or display panel 192 can be provided to indicate the state of operation of the central processor 94. The output port 153 is operative through digital-to-analog converter and buffer amplifier 194 with the provided test point 190 and is operative with display 192. The manual switches 196 are operative with input port 137 as shown.

The P signal goes through the multiplexer 120 to request a particular vehicle operation. The control processor 94 senses the various currents, the various voltages and the vehicle speed. It takes digital feedback signals through buffers to know what is going on in the power circuit in relation to currents and voltages. The control processor 94 provides output command signals to the power circuit. Command signals go on the data bus and output ports function as latches so the control processor 94 can proceed to do other things while each latch remembers what is on the data bus at a given address. The control processor 94 outputs a signal to close whatever power switches are desired and also outputs a requested motor current. The requested motor current is decoded in a digital-to-analog converter. The analog motor control circuit, in response to this current request, senses the actual motor current and the commutating capacitor voltage, and if everything is satisfactory, the motor control circuit appropriately fires the drivers for the chopper apparatus.

Figure 5:
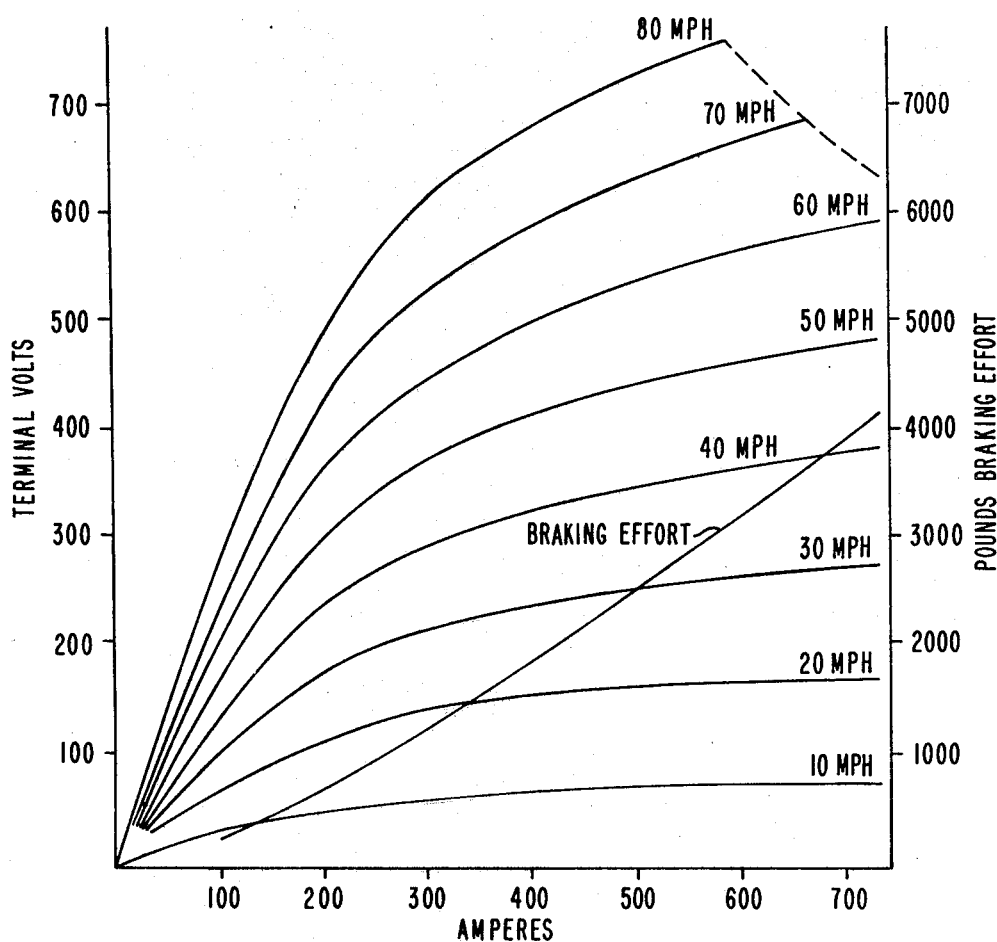
FIG. 5 shows a well known operational characteristic curve for a typical series propulsion motor operative with a train vehicle and the present control apparatus.

In relation to effort versus motor current, at up to about 100 amps, a typical series propulsion motor as shown by FIG. 5 provides little practical effort, and above 100 amps the characteristic looks more or less like a straight line. As speed increases there is wind resistance, so the effective effort available is actually less in power, and in braking, the reverse is true. When power is requested motor current comes up to the P signal requested level at a jerk limited rate. The vehicle increases its speed because of the effort supplied. The phase increases with speed, and when the phase approaches almost 100%, the full field operation is completed and the field shunt is used to weaken the motor field, and this provides a transient response problem; a very fast controller is required, such that it can properly control the phase on the thyristors. In actual practice, propulsion power is easier to control because in power a particular phase angle sets a percentage of line volts on the motor and this will give a particular amount of motor current, such that if the phase is set at 50%, a particular amount of current is provided in power operation for a given speed. In brake operation, this same relationship is not true since brake operation is more unstable. If the phase is held at a desired place in power operation, the motor current is stable; if a particular phase setting is held in brake operation, the motor may go to overload or to zero. If it is desired to initiate brake operation, the control apparatus has to command brake which ramps down the motor current on a jerk limit, then opens up the power switches and reconnects the power switches for brake operation; thereafter, the control apparatus goes into brake operation and ramps up the motor current to give the torque necessary to get the desired brake effort. The motor may be generating a considerable voltage that goes back into the supply line so a resistor is put into the circuit to dissipate the excess voltage. As the vehicle comes down in speed, the motor counter EMF drops and the chopper can no longer sustain the motor current, so switches are operated to change the resistors to maintain the desired motor current. If the line voltage exceeds a particular value to indicate that the line is not receptive and will not accept the generated current, the motor current is reduced if no dynamic braking resistor is used with dynamic resistors in the circuit, if the line voltage becomes excessive, the motor current is shunted into the dynamic braking resistor.

Figure 3B:
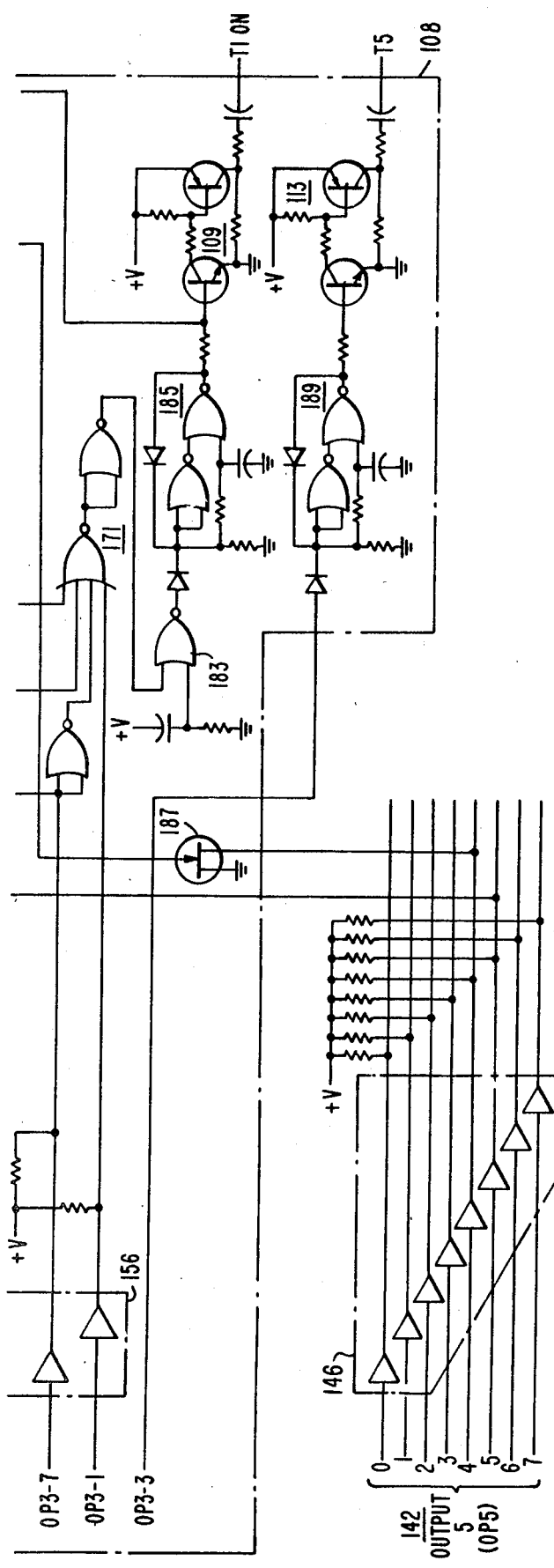

In FIGS. 3A and 3B there is schematically illustrated the provided interface of the present chopper logic control apparatus. The digital input 100 is shown in FIG. 3B operative through the buffers 132 with the input port 136. The analog input 102 is shown in FIG. 3A operative through multiplexer 120 and the analog to digital converter 122 with the input port 124 of the microprocessor. The output port 130 is operative with the register 131 to control the multiplexer 120 and the analog to digital converter 122. The output port 152 is shown in FIG. 3A operative with the digital to analog converter 158 and the analog phase controller 108; the output port 106 is shown in FIGS. 3A and 3B operative through buffer amplifiers 156 with the drivers 109, 111 and 113 for controlling the respective thyristors T1, T2 and T5. The output port 142 is shown in FIG. 3B operative with the isolation amplifiers 146. The output port 140 is shown in FIG. 3B operative with the isolation amplifiers 144. The output port 153 is shown in FIG. 3B operative with isolation amplifiers 194 and test point 190 and operative with display 192.

The pump circuit 151 operates to verify the proper working of the present control apparatus including the microprocessor 94 before the line switch is picked up and the desired propulsion motor control operation takes place. A dummy boost signal is initially put out at program line 16 to enable the line switch to be picked up, and during the main program operation if something goes wrong the boost signal disappears and the line switch drops out. The Y carrier shown in FIG. 4 has added to it the boost bit, and then time is called to wait as shown by the code sheet; the Y carrier indicates whether the OFF suppress or the ON suppress is called for.

The load weighed current request signal is output by amplifier 153. Then the buffer 155 leads to the phase controller amplifier 157, which takes the current request signal from buffer 155 and the motor current signals I1 and I2 from lines 159 and 161. The output of controller amplifier 157 is the requested OFF pulse position or the phase angle IP. The output of the amplifier 157 is compared by comparator 163 with the timing ramp from amplifier 165 which is reset by the computer each 218 Hz. The comparator 163 establishes when phase angle signal IP has exceeded the timing ramp, and this would determine at the output of comparator 163 where the OFF pulse is positioned. The logic block 167 determines whether or not the OFF pulse position output of comparator 163 is actually used. For example, if comparator 169 determines there is too much current in the system, the OFF pulse will be fired and might inhibit or suppress the ON pulse in logic block 171 which is operative with the ON pulse. The boost pulse comes from the computer and goes into the logic block 167 on line 173, and will fire an OFF pulse on the leading edge if comparator 168 has not already fired a pulse and suppress any further action out of the control system. The logic block 167 includes a flip-flop operative such that if an OFF pulse is fired once during a given program cycle, a second OFF pulse is not fired during that same program cycle. The power up restart circuit 175 suppresses pulses with the control system has time to operate properly. The circuit 177 is a monostable to assure that only a pulse is output, and circuit amplifier 111 drives the OFF pulse going to the gated pulse amplifier for thyristor T2. In power mode the FET switch 179 is closed to provide the desired motor characteristics compensation signal, and in brake mode, this switch is opened to provide a faster controller operation. The amplifier 181 checks the phase controller 157 to see if the signal IP is all the way up against the bottom stop to indicate too much current, and if so, the circuit 171 suppresses the ON pulses; this is used when starting up in power to skip ON pulses. The ON pulses are suppressed by the power up circuit 183. The ON pulses use the monostable 185 and the driver 109 as in the operation for the OFF pulses. The safety enable signal or pump circuit 151 will stop the firing of an ON pulse if repetitive boost signals are not provided. The FET switch 187 energizes the line switch output, such that if there is no activity on boost signal line 173, then the pump circuit 151 will cause FET switch 187 to keep the line switch dropped. The T5 signal comes from the computer to fire the T5 thyristor, and monostable 189 drives the driver circuit 191 going outside to the gated pulse amplifier for the T5 thyristor. The phase controller 108 includes the operational amplifier 157, with its attendant compensation for power and brake operations. The computer can force the controller 108 from output port 3-0 to zero for startup. The pumping circuit 151 checks the activity of the computer by looking at the boost line 173 for snubbing the provision of ON pulses and thereby controls the line switch. If the line switch is out, the propulsion and brake control system cannot operate the chopper apparatus, so if something is wrong, it is important to snub the ON pulses quickly, because the line switch takes time to drop out; for this reason an effort is made to stop the ON pulses when some control apparatus malfunction occurs and is sensed by the boost signals no longer being provided.

Figure 4:
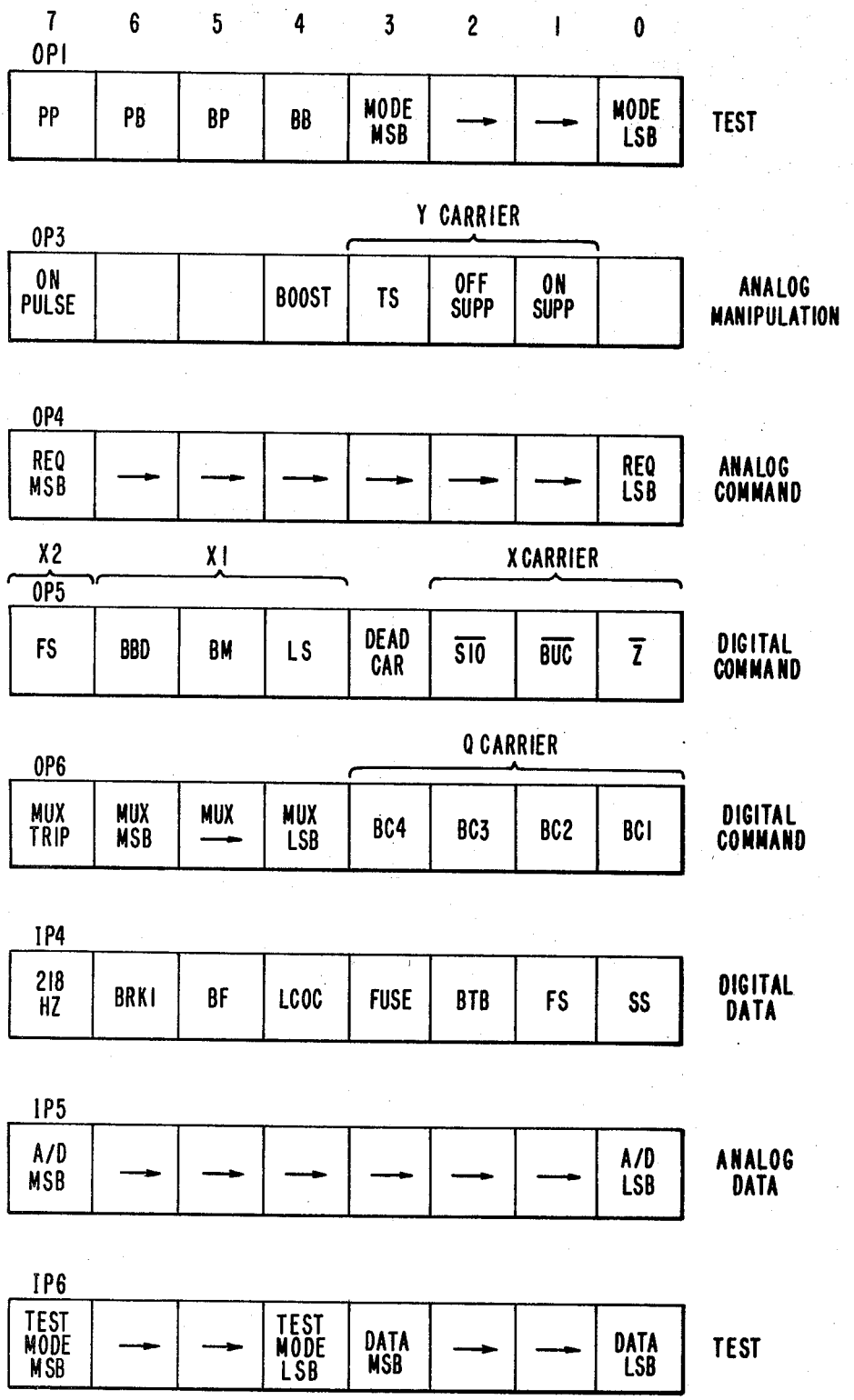
FIG. 4 illustrates the coding of the program listing included in the appendix.

FIG. 4 illustrates a code sheet that was used to develop the program listing included in the Appendix. As shown in FIG. 4 and in reference to FIG. 2, output port 1 (shown in FIG. 2 as 153) was used for a test mode, output port 3 (shown in FIG. 2 as 154) was used for analog manipulation, output port 4 (shown in FIG. 2 as 152) was used for analog command signal output, output port 5 (shown in FIG. 2 as 142) and output port 6 (shown in FIG. 2 divided into four bits each for 140 and 130) were used for digital command signal outputs, input port 4 (shown in FIG. 2 as 136) was used for digital input data, input port 5 (shown in FIG. 2 as 124) was used for analog input data and input port 6 (shown in FIG. 2 as 137) was used for test purposes in relation to manual input switches.

In FIG. 5 there is shown a motor characteristic for a well-known series Westinghouse traction motor of Type 1463 operative through a 5.58 to 1 gear ratio with 30 inch vehicle wheels.

SPEED SIGNAL HYSTERESIS

The values of the brake resistors are selected for inherent stability of the system operation during brake mode. In reference to FIG. 5 for a given supply line voltage as seen by the vehicle motor, realizing that FIG. 5 relates to one motor and for two motors connected in series an 800 volts supply line would provide in the order of 400 volts across each motor, when the chopper is switched off the circuit should cause a motor current decrease in brake mode of operation. When the chopper is switched ON, the motor current should increase. For an 800 volts power supply line, about 400 volts is applied across each motor, and if a well-known load line is applied to FIG. 5, the slope of that line would be a function of the resistance of the motor circuit with the motor considered to be a generator in the brake mode, the motor circuit includes a resistance and the voltage across the motor is determined by the speed of the motor and the requested motor current. On an average basis of the chopper operation, the voltage generated by the motor minus the motor circuit resistance IR drop must be equal to the supply line voltage. If the generated voltage minus the IR drop exceeds the supply line voltage, then a larger current will result and a lesser current will result if the opposite is true. The motor is operating as a generator, so the more current requested from the motor causes the motor voltage to go higher, since more current will cause more volts to be generated. In effect the generator is operating as a negative impedance device, and to assure stability of the circuit the positive resistance added to the circuit has to be greater than the negative resistance of the generator. Thusly, this limits the requested brake current available to avoid having the generated voltage exceed the line voltage and bring about an unstable system operation. In an effort to obtain the desired brake current magnitude, resistors are inserted into the circuit to provide a different slope to the load line in relation to the vehicle speed. When the chopper is OFF, the line voltage plus the IR drop should be greater than the generated motor voltage. When the chopper is ON, it more-or-less shorts the supply line and the applied supply line voltage goes down to near zero volts and a net positive voltage results. A chopper adjusts the time spent OFF at the higher applied supply line voltage compared to the time spent ON at the lower applied near zero supply line voltage, so the average voltage intercepts the speed characteristic curve at the desired motor current for the desired brake effort operation. As the vehicle slows down, the chopper has to be ON more to maintain this brake motor current until the chopper is ON full time and with no other action than the current would begin to decrease. The motor circuit resistance value can now be changed at some point as a function of vehicle speed, to change the slope of the load line and this permits the chopper to operate at a lower speed. Thusly, the brake resistors are inserted into the motor circuit for the upper speed operation of the motor, and when the motor speed gets below a determined value the resistors are switched out of the circuit to improve the control range of the chopper circuit. The resistors have to dissipate a considerable amount of energy as heat loss in the regenerative brake mode and this should be minimized by changing the resistance as soon as practicable in relation to a reasonable number of brake resistors and switches and the time required to do this. In the operation of the Sao Paulo equipment at about 70 MPH the first reactor is changed, at about 60 MPH another resistor is changed, and at about 40 MPH the last resistor is switched out.

The speed signal sensing operation for this purpose requires a stable speed signal to determine the switching of these brake resistors, and further it is not desired to switch these resistors into and then back out of the motor circuit as a result of noise signal effects and the like. The whole motor circuit would be significantly disturbed by such a practice. For each resistor change that is made, the motor is generating so many volts, the supply line is providing so many volts and a sudden resistor change creates a delta voltage condition in the motor circuit, and to reestablish the desired circuit operation level the chopper phase angle is changed. The chopper operates to determine the net voltage across the motor circuit, including inductance. The current rate of change is determined by the voltage across that inductance.

Figure 6:
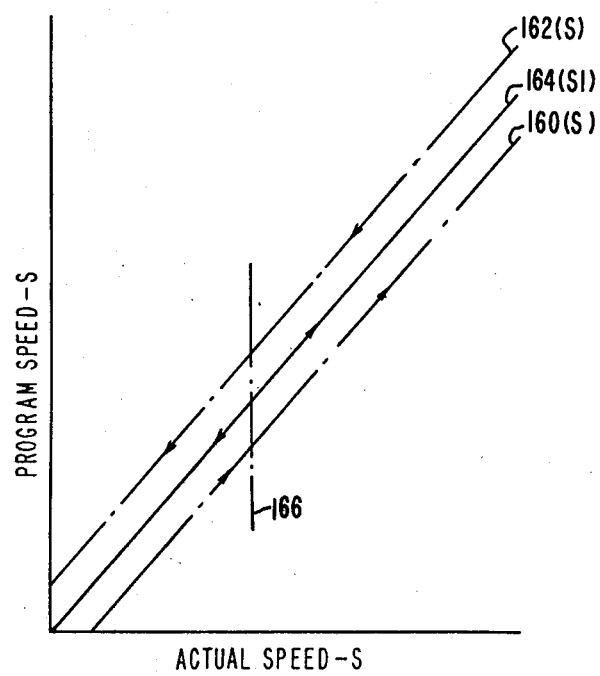
FIG. 6 illustrates the speed signal determination in accordance with the present invention.

The measured vehicle actual speed S1 varies as required by the desired transit vehicle performance. The internal program speed S shown in FIG. 6 as curves 160 and 162 is made to follow the measured actual speed S1 shown by curve 164. The program speed S shown by curve 160 follows in the up direction of the actual speed and the program speed S shown by curve 164 follows in the down direction of the actual speed. When the actual speed S1 shown by curve 164 and on line 166 is increasing, the program speed S shown by curve 160 is at a predetermined difference such as 1 KPH less; and when the actual speed S1 shown by curve 164 and on line 166 is decreasing, the program speed S shown by curve 162 is at a predetermined difference such as 1 KPH greater. This results in the program speed S following behind the actual speed by the 1 KPH difference until the actual speed S1 reverses and begins to decrease, at which time the program speed S would stay at the same value until the actual speed S1 decreased to 1 KPH below the program speed, and the program speed S would then follow at 1 KPH above the actual speed. If, for some reason, a noise perturbation of the speed vehicle actual reading taken from a tachometer operative with a wheel axle should occur, this might otherwise needlessly trip the switch contactors in the brake resistor circuits, and a considerable number of other speed related decisions are made in the course of the program operation. If the actual speed S1 is greater than the program speed S plus three units (about 1 KPH) in program line 91 then the program speed S is incremented by one, and if the program speed S is greater than the actual speed S1 plus three in program line 92 then the program speed S is decremented by one, which provides in effect a two KPH speed signal hysteresis band. It was known in the prior art to provide a hysteresis effect for each speed signal decision operational amplifier, but not to involve many functions of the same speed variable and put the hysteresis on the speed variable before making the many desired functional decisions.

Because there are a number of decisions that are made throughout the whole program in response to vehicle speed, by providing this hysteresis effect, the general problem of oscillating decisions in relation to sensed speed is avoided. Every time a decision level in speed is reached, the speed has to be determined by this provided hysteresis band before the control action responds for the rest of the program operation.

The internal artificial parameter S is established in relation to S1 the currently read actual speed, so the parameter inside the program is related to the actual speed. At program line 91, if the actual speed S1 is greater than S +3, such that the new value of speed or the currently read value of speed is greater by a magnitude of 3 more than the program speed S, then the program speed S is incremented by 1 once every program cycle. First, this operation gives a bulk hysteresis on all decisions made on measured actual speed and secondly it acts as a filter because the internal speed S is changed only one increment per program cycle. If there is any noise in the measured speed, the program speed S will only change by a small amount once per cycle. A hysteresis condition is put on measured speed by requiring that the newly measured actual speed changed by an amount greater than 3 units, and then only allows a one unit change to the speed S seen by the program.

Since the programs speed moves faster than the vehicle speed S only noise is filtered out, and the actual speed is not affected.

ELECTRIC BRAKE EFFORT FADE OUT

Figure 7:
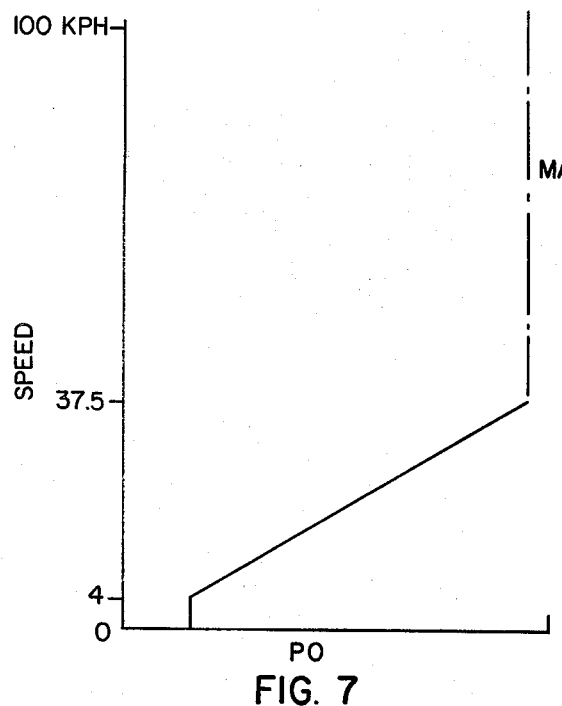
FIG. 7 illustrates the relationship of requested current as a function of speed provided by the present invention.

The brake fade out occurs after all the brake resistors are out of the motor circuit, and the thyristor chopper is full ON, and the speed is going down such that current can no longer be maintained. The purpose is to adapt the faster electrical brake effort characteristic to the known slower mechanical brake effort characteristic. It is desired to slow the electrical fade so that together with the mechanical brakes no jerk is noticed in the net brake effort. This permits the slower mechanical brake effort to keep up with the drop off of the electrical brake effort. The minimum circuit resistance is known and the operating characteristic of the chopper apparatus is known. There is a motor current point of minimum voltage for the chopper at maximum ON time. The brake effort request determines the motor current. If the speed goes down beyond this current point, the motor current cannot be sustained and electrical brake effort control will be lost. The mechanical brake must satisfy the jerk limit rate of change of deceleration of how fast the mechanical brakes can be applied, and it is known to require a certain time period to apply the mechanical brakes from zero to maximum levels of operation. Knowing the accelerating rate of the vehicle, the time for a change in speed determines the speed value at which the computed electric brake fade out should start, and the program line 85 states this vehicle speed is in the range of 60 hexadecimal to 10 hexadecimal. A speed range of 0 to 100 KPH in Sao Paulo is represented by a binary relationship of 0 to 256, and 60 hexadecimal represents 37 percent or 37 KPH and 10 hexadecimal represents 4 percent or 4 KPH. Program line 86 states that if the requested current PO is greater than twice the value of speed minus 20 hexadecimal, then PO is set equal to the latter. In FIG. 7 the speed versus requested current relationship is shown to illustrate how the value of PO falls off as function of speed reduction until the speed reaches a value of 11 hexadecimal in program line 88 where PO is set at a fixed value.

The provided taper allows the mechanical brakes to build up in effort to compensate for the reduction in the electric brake effort.

Figure 8:
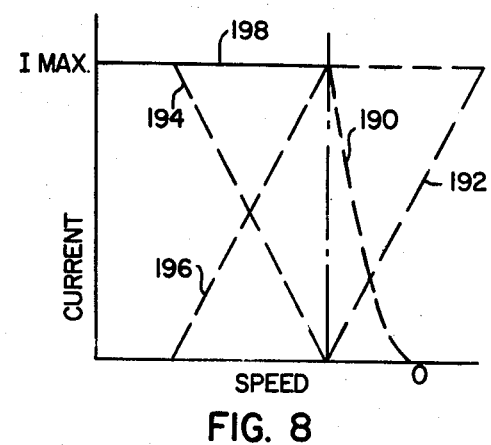
FIG. 8 illustrates the provided electrical brake fade out in relation to the operation of the mechanical brake.

In FIG. 8 curve 194 shows the provided electrical brake fade out and curve 196 shows the friction mechanical brake effort build-up, and sum of these two curves 194 and 196 is the desired constant value curve of resulting net brake effort 198. Without the here provided controlled electric brake fade out, the curve 190 illustrates the uncontrolled electric brake fade out that would otherwise result.

The dynamic brake feedback signal to the mechanical brake system causes the mechanical brake to build up early and follow the controlled decrease of the dynamic electric brake system. The program line 86 operates to reduce the P signal current request as a function of speed, and this controls the generated brake current in the regenerating motors. A false motor current fade out is provided while the vehicle speed is adequate to maintain the motor current as desired.

FIELD SHUNT CONTROL

Motor operation characteristic curves such as those shown in FIG. 5, but related to tractive effort for full field operation and field shunt operation, are well known to persons skilled in this art. For a given motor current, the tractive effort of the motor with full field operation and for shunt field operation can be determined. In power more current is requested as the speed increases whereas in brake less current is requested as the speed is increased. When the field is shunted, this shifts the motor characteristics and if a given tractive effort is required to give the acceleration rate desired, as the speed increases for a given current the full field operation is suitable up to some speed. If it is desired to keep the same tractive effort level, it becomes necessary to shunt the field and increase the motor current to a new level corresponding to the shunt field operation. At this new current level, the desired tractive effort can be obtained up to a higher speed of motor operation. This additional speed is obtained by paralleling the motor fields into shunt operation, to provide one-half motor armature current in each motor field. Once the 95% ON duty cycle of the chopper is reached, before the field shunt is changed, a predetermined time delay is provided by counting a number of clock pulses to avoid instability of field shunt change. When the field shunt is changed, this significantly changes the motor characteristics and the chopper has to adjust from the 95% ON duty cycle to a new phase angle of operation, such as in the order of 70% ON duty cycle of the chopper. It is desired to assure that the chopper operation is actually stable at the 95% ON duty cycle and not an anomaly of noise perturbation to only momentarily bring the chopper to the 95% ON duty cycle level. The phase angle controller is very fast in operation and it is not desired to respond to a momentary high phase angle condition and change the field shunt before the chopper is at a steady-state 95% ON duty cycle of operation, and then have to unshunt the fields when the chopper returns to its stable operation below the 95% on duty cycle condition. This would require going from a parallel field connection back to a series field connection and this is objectionable in relation to the switches and the motor operation. Once the 95% ON duty cycle condition is maintained for the provided time period, the switches are operated to shunt the motor fields and this causes the chopper to phase back to about a 75% ON duty cycle. Therefore, the decision point has to be moved now from the previous 95% ON level value of about a 60% ON duty cycle level, so the motor fields do not unshunt by the expected phase back of the chopper operation. This provides a hysteresis conditioning of the response to the chopper phase angle, including a time element in the response, to improve and make more stable the motor field shunt control operation.

Figure 9:
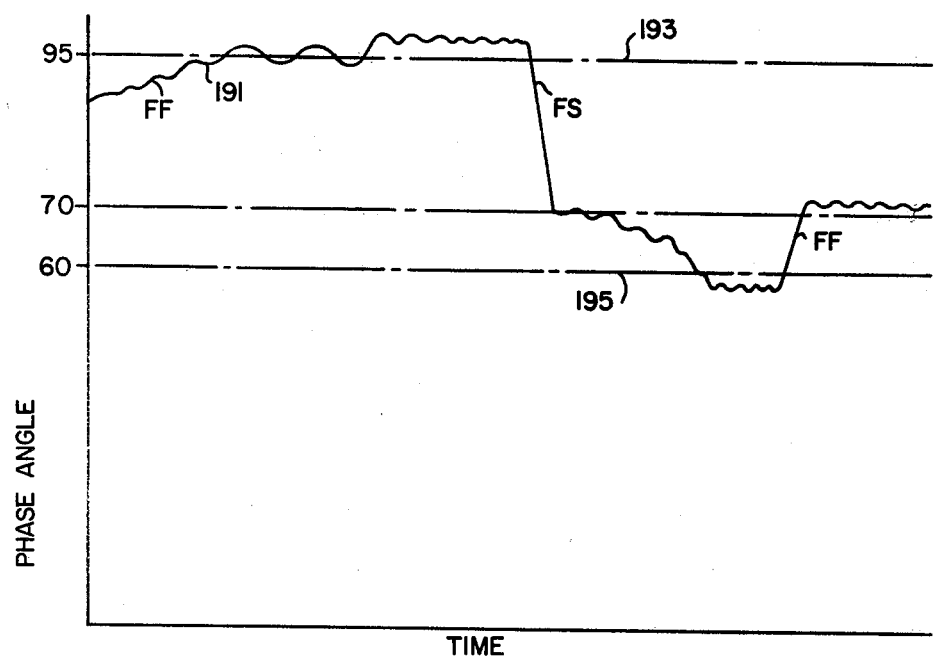
FIG. 9 illustrates the phase angle sensing operation provided by the present invention.

At program line 128 if the phase angle PH is greater than 0E5 hexadecimal, then a timer TP is incremented at program line 129 by one per program cycle if the phase angle stays continuous. If TP becomes greater than 13 hexadecimal then TP is forced to have a maximum of 13 hexadecimal. At program line 130 if TP is greater than 10 hexadecimal, the field shunt switches are operated. The program line 128 senses when the phase angle exceeds about 95% ON duty cycle, and the operation of timer TP to increment by one for each program cycle provides a desired time characteristic for the phase angle to remain above this upper limit of about 95% ON duty cycle. This operation is shown in FIG. 9 where the phase angle 191 has to remain above the provided upper limit 193 for a desired time period before the field shunt operation is effected. When the field shunt changes, then the phase angle of the chopper drops to about a 70% ON duty cycle. The available dynamic range of the full field operation was about finished since with a full field the motor was generating a lot of back EMF which was equalizing the supply line voltage and this required the chopper to be ON most of the time. When some of the field is shunted, this weakens the magnetic field in the motor and reduces the back EMF, and to get more current at the same torque the chopper is phased back towards the OFF position to give more dynamic range again. At program line 131 if the phase angle goes below a minimum limit of about 60% ON duty cycle, then at program line 132 the timer TP is decremented by one for each program cycle. This recognizes when the phase angle is below some limit for a given number of program cycles, and when the time TP is less than 10 hexadecimal at program line 130 this opens the field shunt contactor. At program line 122 the input 4 is read to bring back the status of field shunt FS, to indicate whether or not the field shunt has actually closed because this is a non-time related thing; that is, whenever the request is made to close the field shunt, there is a time element involved in the mechanics, so it takes a certain amount of time for it to happen, and the program waits after the request is put out for the response that says the field shunt has actually closed; and when it is actually closed, at program line 118 an increment of current of 49 hexadecimal is added to the current request.

The program listing included in the Appendix is written in a language called PLM which was developed for use with the INTEL microprocessor, such as the central processor 94. This is a high level assembly language which can be compiled into machine language. The numbers used in the listing are in the hexadecimal number system, which is a base 16 number system. The first part of the listing in lines 1 to 6 is for bookkeeping purposes and identifies for the program the variables, the constants and the labels used in the course of the program. More specifically, K is an artificial constant that it set in the brake mode for controlling the brake build-up. IRW is the current request that has been load weighted to compensate for the weight of the car. I0 is the old current, I1 is one of the motor circuit currents and I2 is the other motor circuit current. IR is the current request. LVL is the modified line voltage. PR is the permission to regenerate. RE is the retard the effort due to a number of conditions such as overline voltage or overcurrent or the like. TI is a timer. IL is line current. LV is line voltage. M is the mode of the external equipment. M0 is the old mode and M1 is the transitory mode as determined by the mode request and the position of the power brake switch. N is a counter. PH is the phase that the external analog controller is controlling and that is brought back in to establish the field shunting. PI is the P signal that is used internally to do mode changes, PH is the new presently read P signal and PO is the jerk limited P signal. TT is a timer. SI is the speed after the hysteresis has been applied. TOS is blank ZI and Q are carriers to the external analog controller and establishes certain modes of operation. S is the currently read speed signal and SS is the speed signal after it has been modified for the taper on the power and brake modes. T is a timer, TP is a timer and TS is a timer. X, X1, S2, Y and Z are external controls for the analog controller. The three upper lines in the program listing are the variables used in the program. The next three lines are labels that identify in the program certain starting points where the program can jump to if needed. The compiler assigns memory locations for each variable, and any time a given variable is read, the computer knows the memory location. The mode labels are used to assign locations in the program.

The program defines the desired sequence of steps to be followed in controlling the propulsion and electric braking operation of a transit vehicle. The safe mode of operation is the brake mode. Therefore, the present control program listing always starts up through the brake mode. If an abnormal condition is detected, the program operation returns to the beginning and resequences through the brake mode. In comparison, the prior art control systems shut the chopper OFF and did not try to reinitialize the equipment or to make sure the start of the operation was always from the same base.

In line 8 and mode 1 of the program an output port is directed to take a certain state, which is output port 1, and the constant Q is initialized to equal zero. In lines 9 to 14 of mode 1 the program sets the output line switch out and checks if it is satisfactory and then reads the line voltage. The program looks at the inputs, the slip slides, and so forth to see that they are in proper form and then tests for line voltage. If the line voltage at line 14 is not satisfactory, the program goes back to line 8 and the start. If the line voltage is satisfactory, a false boost signal is output at line 16 of the program because the line switch cannot be picked up until a boost is provided, so a false boost is provided for this purpose. The motors will not be energized at this time because the ON and OFF pulses for the thyristors have been suppressed. If the line voltage is all right, then in line 17 of mode 2 of the program the line switch is closed for charging the commutating capacitors and a check is made at line 18 to see if all the inputs are as desired, and if they are satisfactory, the program at lines 20 and 21 initializes certain timer variables.

Figure 3B:
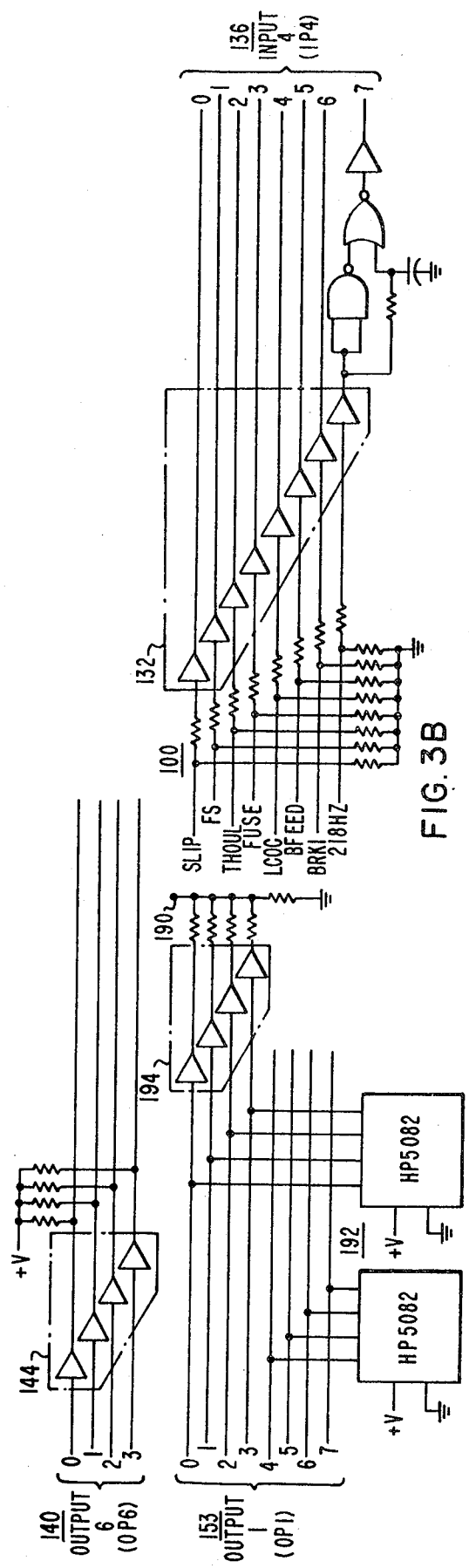

In line 24 of mode 3 of the program the program waits for a pulse from an external clock at 218 Hz from a crystal oscillator and when the program sees the rising edge of the clock pulse, it provides the front end of the boost to fire the ON pulse and puts ON pulse positioner up to output the request through output port 106 shown in FIG. 3.

Lines 26 to 30 of mode 4 of the program are controlling the external analog phase controller 108 to provide a boost interval for interpreting the current signals and other things as to where the ON pulse will be and whether or not it is allowed, and providing the ON suppress and the OFF suppress.

In mode 5 lines 40 to 64, the program reads analog inputs and sets some variables. The P signal which is a linear monotonic type signal is converted to effort. When the P signal is above 60 milliamps this is a power request, when the P signal is below 60 milliamps it is a brake request, and below 20 milliamps it is superbrake. If the line voltage LVL is less than some predetermined number then the operator RE is set to retard the effort. In addition, a speed taper is provided whereby the speed signal S is read in the outside world and is modified so that the internal speed signal SS stays at the given level as long as the external speed signal is within predetermined limits. The external speed S is the actual vehicle speed and the internal speed SS is the value that the program is using for its operations. In effect a window is put on the real vehicle speed and then used inside the program as a bracketed speed such that as the outside speed starts moving up, then the inside speed SS does not change for as long as the outside speed S is within this provided window, thereby if the outside speed S has noise interference, this provides a dead band for filtering the noise and other disturbances out of the actual speed signal S.

In lines 32 to 38 of mode 6, a determination is made to go to power or go to brake and to confirm that the control is in power or the control is in brake for the purpose of setting up the request.

Starting at line 65 of mode 7, the P signal is considered, which P signal has a value from 0 to 100, for the generation of requested effort. If the control is in power and the P signal is above 60 milliamps this requires more effort. If the P signal is below 60 milliamps and the control is in power, this maintains a minimum effort. If the control is set in broke and the P signal is below 60 milliamps, this requests an increased brake effort down to 20 milliamps, at which time the same effort is held. If the P signal is above 60 milliamps but the BRK signal does not allow the control to go into power, a minimum brake effort is maintained. In addition, a jerk limit is provided in lines 75 to 82 of the program because the P signal can change instantly to a full 100 milliamps and must be jerk limited such that the effort signal has to increase on a ramp in one program cycle step at a time. The jerk limited P signal is incremented by one unit each program cycle to provide the desired ramp and repeatedly incrementing one at a time determines how quick the effort increases. When going into brake to prevent an abrupt fade-out of the electric motors and to permit a smoother blending of the friction brakes, a false fade-out is provided in lines 84 to 89 of the program so the electric braking fades out on a softer slope to permit the friction brakes to maintain a smooth and total braking effort.

Lines 94 to 98 of mode 8 of the program provides a check for a zero speed when the actual speed is less than a defined amount such that the vehicle is considered to be standing still at zero speed. In addition, zero speed clears the Z carrier within the program used in a situation when there is too much current in brake, which indicates an overload and the operation should be shut down. In line 99 of the program, if the vehicle is at zero speed and a request for power is received, then the Z carrier is cleared to go back into power. A check is made at line 100 to see if the line voltage is too low, and if it is too low, the program returns to the beginning of the program since there is not enough energy for the commutating capacitor and the present control apparatus is not required to operate below a predetermined voltage level, which could means that the vehicle is operating in a rail gap and the normal mode is to shut down the equipment when going into a rail gap. In addition in line 101 of mode 8, a check is made for excessive line voltage which is used for incrementing the RE request. If the voltage is too high, the Y carrier is set for the purpose of skipping On pulses, and the RE request starts reducing the motor current and this reduces the line current. A check is made for LCOC which is a signal that indicates all the power circuitry is made up properly. If any of the conditions, such as a thermal overload or a slip/slide signals or the like, indicates improper action, the effort request is reduced and a suppression of the ON pulse is effected. The Y carrier controls the ON pulse, the OFF pulse and the T5 pulse. A check is made to see if motor current I1 is greater than motor current I2 of vice versa to maintain the desired balance in the motors. A check is made at line 105 to see that I0, which is a sum of I1 and I2, is not exceeding the request IR by more than a certain amount; and if it is, the ON pulses are skipped.

The line current limit check in line 103 of mode 8 is provided to establish that the respective currents in each of the motor circuits are within a predetermined match of each other in relation to balance; if they are, the operation is satisfactory; and if not, corrective action is taken. Towing protection is provided in line 104 to enable a train vehicle to be pulled or towed; if there if a failure in the external equipment of a given vehicle, it is desired that this be recognized and the vehicle operated such that the other operating cars in the train can tow the disabled vehicle.

In lines 110 to 113 of mode 9 of the program the current request is generated from the PR signal from which the retard effort RE is subtracted to get the IR request signal, and a speed tilt is provided in relation to a power mode or brake mode of operation to change the current request IR on the field shunt and check of the inputs. The effort request is the modified P signal which has been modified, then a speed tilt is added to the modified P signal by looking at the speed and tilting the P signal plus when power operation is desired and tilting the P signal negative for brake operation. The speed tilt is provided in lines 114 and 115 by chopping off a little bit of the requested current to compensate for the effort required to maintain acceleration as speed increases; in effect, the requested current is added to or subtracted from, depending upon whether the control is in power or in brake, and this adds or subtracts an increment of vehicle speed. In this regard, during brake, the motor is dragging and the car is dragging, so less effort is needed from the motor current because the drag is additive; however, in power operation, the drag is against the propulsion effort, so additional motor current and effort is provided to compensate for the needed extra power to properly operate the vehicle. The provided speed tilt accomplishes this function in relation to the speed of the vehicle. For the change of the current request on field shunt in lines 116 to 118, if in field shunt operation, then the motor characteristics are different; the field shunt is field weakening, and there is a different current level needed to get the desired motor torque. The input check is provided at lines 120 to 123 to make sure that all the switches and so forth are set where they should be. The input 4 relates to the temperature of the semiconductors; this temperature in the prior art was sensed and if too high was previously used to shut everything down as an irrevocable control move. In the present system, restarting of the program is permitted after a too high semiconductor temperature is sensed. Input 4 is presently checked to see if the temperature is not too high, if it is satisfactory the ON pulse for the chopper is allowed, and the incremental loop timer goes to mode 10. If the semiconductor temperature is too high, the program goes to mode 10 and if necessary, a T5 pulse is fired; for a given cycle of program operation, it may be desired to cancel the ON pulse for that cycle or suppress the OFF pulse or shut off the T5 pulse, or even to turn on the T5, depending on what is desired. If the semiconductor temperature in the next cycle is back to a desired level, the program continues as normal to avoid a total shut-down and permit the transit vehicle to continue running. The present control provides a lessening of the provided effort to permit the equipment to continue running within capabilities and contributing some partial desired effort to the train movement.

Mode 10 of the program includes four selectable control operations—namely, CYCPP which is confirmed power, CYCBB which is confirmed brake, CYCBP which is cycling from brake to power, and CYCPB which is cycling from power to brake. These relate to differences in the desired vehicle control as to when a particular control is desired and what kind of control is desired. More specifically, for the first control operation of CYCPP which is confirmed power, it is desired to stay in power and to confirm that the control is presently in power; the field shunt is closed in lines 129 to 132 in relation to phase angle and the line voltage is cut back in line 134 in relation to low voltage. The close of the field shunt is provided to increase the train speed. To keep the current flowing in the motor, it is necessary to keep turning the chopper ON for longer periods of time to keep increasing the percentage of voltage to counteract the counter EMF of the motor. At some control point, it is desired to move to field weakening, and the control approach taken here senses the chopper being ON for 95% of the time and field weakening is then provided.

In the second operation of CYCBB which is confirmed brake, the request is to be in brake and the control operation is confirmed to be already in brake. This portion of the program permits improved control in the braking mode in relation to regeneration of power, wherein a sequence of control steps is provided in lines 147 to 151 taking progressively stronger action if the line voltage gets beyond defined limits in an effort to control the maximum level of line voltage. If the line voltage starts getting above a predetermined first limit CE, then the request is cut back by two; if the line voltage gets above a predetermined second limit D4, then the previous action has added to it a stronger reduction and so forth through greater predetermined limits to effect progressively increased current reductions due to excess line volts by suppressing ON pulses for the chopper to provide this current reduction.

A hysteresis for brake build-up is provided at lines 152 to 156 by trying to get at least a minimum predetermined current level in the brake mode after the motor armature current has been reversed for braking; this portion of the program provides the requested brake effort in conjunction with a minimum effort to assure an adequate brake current. The problem is to assure after the propulsion motors are established in the proper way to start generating brake current is built up in time to prevent loss of the armature current because when changing from power to electric braking, the braking armature current results from the residual magnetism left over in the field circuits of the motor. If the control apparatus does not operate fast enough and lets this residual magnetism go to zero, the armature current will not build up. In relation to a contribution to regenerative braking or electrical braking, the present control apparatus enables a build up of brake current after going to the brake mode, such that when the build up contactor is closed thereafter only ON pulses are provided with a defeat of OFF pulses until a minimum armature current is present in an effort to assure that the armature current gets started as quickly as it can and before there occurs a loss of the residual field magnetism. The propulsion motor is a series motor, so the armature and field windings are in series. After cutting the armature current to go into a brake operation, it takes a while for the field to be reenergized and this is the residual magnetism that is involved in this operation; the armature circuit is reversed for brake operation, but the field does not go to zero instantly because of residual magnetism. When it is desired to go into the brake mode of operation, the program maintains a minimum level of current in the brake mode and permits the armature current build up in the opposite direction to an adequate level to maintain the field magnetism and still reverse the current flow in the armature; the control operation desires a current above a certain value and assures that at least this value of armature current is maintained.

```
     0F0H:

1         DECLARE (K, IRW, I0,I1,I2,IR,LVL,PR,RE,TI) ADDRESS;

2         DECLARE (IL,LV,M,M0,M1,N,PH,PI,PN,P0,TT) BYTE;

3         DECLARE (S1, TOS, Z1, O,S,SS,T,TP,TS,X,X1,X2,Y,Z) BYTE;

4         DECLARE (MODE1,MODE2,MODE3,MODE4,MODE5) LABEL;

5         DECLARE (MODE6,MODE7,MODE8,MODE9,MODE10) LABEL;

6         DECLARE (MODE11,CYCPP,CYCBB,CYCPB,CYCBP) LABEL;

7         GO TO MODE1;

8  100H: MODE1: OUTPUT(1)=0F1H; O=0;

9         OUTPUT(5)=24H;

10        IF (INPUT(4) AND 3FH)<>12H THEN GO TO MODE1;

11        OUTPUT(6)=080H+0; OUTPUT(6)=0;

12        OUTPUT(3)=86H; OUTPUT(4)=00H;

13        LV=INPUT(5);

14        IF LV<76H THEN GO TO MODE1;

15        GO TO MODE2;

16 140H: MODE2: OUTPUT(1)=0F2H; OUTPUT(3)=14H;

17        OUTPUT(5)=34H; OUTPUT(3)=04H;

18        IF (INPUT(4) AND 3FH) <>02H THEN GO TO MODE2;

19        OUTPUT(3)=82H; OUTPUT(3)=02H;

20        M=0; M1=0; N=0; P0=00H; RE=2; TI=0; T=0;

21        TP=2; TS=0; Y=02H; Z=1;

22        GO TO MODE3;

23 1C0H: MODE3: OUTPUT(1)=0F3H;

24        IF (INPUT(4) AND 80H) =80H THEN GO TO MODE3;
```

```
25        GO TO MODE4;

26  200H: MODE4: OUTPUT(1)=0F4H;
27        OUTPUT(3)=(10H+(Y AND 0F7H));        CALL TIME(4);
28        OUTPUT(3)=90H+Y; OUTPUT(4)=SHR(IR,1);
29        OUTPUT(3)=10H+Y; CALL TIME(4);
30        OUTPUT(3)=Y;
31        GO TO MODE5;

32  260H: MODE6: OUTPUT(1)=0F6H;
33        IF (INPUT(4) AND 40H)=00H  AND TS>0F0H AND Z=1 THEN DO;
34          M=1; TS=0; END;
35        IF (INPUT(4) AND 40H)=40H  THEN M=0;
36        IF TS>0F4H THEN TS=0F4H;
37        IF (INPUT(4) AND 20H)=00H  THEN M0=0; ELSE M0=1;
38        IF S>0FDH THEN M=0;
39        GO TO MODE7;

40  300H: MODE5: OUTPUT(1)=0F5H;
41        OUTPUT(6)=080H+Q; OUTPUT(6)=Q;
42        N=N+1;
43        I1=INPUT(5);
44        OUTPUT(6)=090H+Q; OUTPUT(6)=Q;
45        SS=SHR(S,3);
46        I2=INPUT(5);
47        OUTPUT(6)=0A0H+Q; OUTPUT(6)=Q;
48        I0=I1+I2;
49        IL=INPUT(5);
50        OUTPUT(6)=0B0H+Q; OUTPUT(6)=Q;
51        OUTPUT(6)=Q; OUTPUT(6)=Q;
```

```
52    LV=INPUT(5);
53    OUTPUT(6)=0C0H+Q; OUTPUT(6)=0;
54    LVL=LV;
55    LVL=LVL+LVL+LVL;
56    S1=INPUT(5);
57    OUTPUT(6)=0D0H+Q; OUTPUT(6)=0;
58    OUTPUT(6)=Q; OUTPUT(6)=0;
59    PN=INPUT(5);
60    OUTPUT(6)=0E0H+Q; OUTPUT(6)=0; OUTPUT(6)=Q; OUTPUT(6)=
61    PH=INPUT(5);
62    OUTPUT(6)=0F0H+Q; OUTPUT(6)=0; OUTPUT(6)=Q; OUTPUT(6)=
63    IRW=INPUT(5); IRW=IRW+IRW+IRW+IRW;
64    GO TO MODE6;

65  400H: MODE7: OUTPUT(1)=0F7H;
66    IF PN<96H THEN PI=99H-PN;
67    IF PN>9CH THEN PI=PN-99H;
68    IF PN<9EH AND PN>94H THEN PI=0;
69    IF PN<96H AND M=1 THEN PI=0;
70    IF PN>9CH AND M=0 THEN PI=0;
71    IF PI>66H THEN PI=66H;
72    IF PN<26H THEN DO;
73      PI=66H; M=0; END;
74    IF M=1 THEN PI=PI+SHR(PI,2);
75    IF N>3 THEN DO;
76      N=0; IF LV<0C8H THEN RE=RE-1;
77      IF (M+M0=1) THEN DO;
78        T=T+1; P0=P0-1; END;
79      ELSE DO;
80        IF IRW>(I0+24H) THEN P0=P0-2;
```

```
81           IF PI>P0+1 THEN P0=P0+1;
82           IF PI<P0-1 THEN P0=P0-1; END;
83         END;
84       IF M0=0 THEN DO;
85         IF S<60H AND S>10H THEN DO;
86           IF P0>(S+S-20H) THEN P0=(S+S-20H);
87           END;
88         IF S<11H THEN P0=04H;
89         END;
90       IF P0<4 THEN P0=4;
91       IF S1>S+3 THEN S=S+1;
92       IF S>S1+3 THEN S=S-1;
93       GO TO MODE8;

94  580H: MODE8: OUTPUT(1)=0F8H;
95       IF S<09H THEN DO;
96         X=04H; IF M0=0    THEN Z=1; END;
97         ELSE X=05H;
98       IF S>33H THEN X=01H;
99       IF Z=1 THEN Y=00; ELSE DO; P0=4;  GO TO MODE11; END;
100      IF LV<6EH THEN GO TO MODE1;
101        IF IL>0C7H THEN RE=RE+2;
102        IF RE<2 THEN RE=2; IF RE+1>PR THEN RE=PR-1;
103        IF I1>I2+30H THEN Y=02H; IF I2>I1+30H THEN Y=02H;
104        IF I0>40H THEN M1=M0;
105        IF I0>IRW+0C0H THEN Y=02H;
106        IF (I0>IRW+100H) OR (I0>2F0H) THEN DO;
107          Q=0; X1=X1+30H; Y=02H; X2=00; P0=02H; IR=00H; Z=0;
108          GO TO MODE11; END;
109        GO TO MODE9;
```

```
110  720H: MODE9: OUTPUT(1)=0F9H;
111       PR=P0;
112       PR=PR+PR+PR+2FH;
113       IR=PR-RE;
114       IF (SS<IR AND M0=0) THEN IR=IR-SS;
115       IF M0=1 THEN IR=IR+SS;
116       IF (INPUT(4) AND 02H)=00H THEN IR=IR+49H;
117       IF IR>1FFH THEN IR=1FFH;
118       IF IR<49H THEN IR=49H;
119       IF (INPUT(4) AND 1DH) <> 00 THEN TT=0;
120       IF TT<06H THEN DO;       P0=4;Y=03H; END; ELSE DO;
121       TT=70H; END;
122       IF (INPUT(4) AND 08H)=08H THEN Y=0BH;
123       TT=TT+1;
124       GO TO MODE10;

125  800H: MODE10: OUTPUT(1)=0FAH;
126     CYCPP: IF M=1 AND M0=1 THEN DO;
127          OUTPUT(1)=8AH; Q=0; TI=0; T=0; X1=10H;
128          IF PH>0E5H THEN DO;
129             TP=TP+1; IF TP>13H THEN TP=13H;
130             IF TP>10H THEN X2=80H; END;
131          IF PH<0D0H THEN DO;
132             TP=TP-1; IF TP<2 THEN TP=2;
133             END;
134          IF IRW>LVL THEN RE=RE+2;
135          GO TO MODE11;
136          END;

137     CYCBB: IF M=0 AND M0=0 THEN DO;
```

```
138       OUTPUT(1)=1AH; T=0;
139     : TS=TS+1; TP=2; TI=TI+1; IF TI>200H THEN TI=200H;
140       X1=30H; X2=00H; T=0; Q=00H;
141       IF S>009H THEN Q=0FH;
142       IF S<1AH THEN DO; Y=02H; IR=0; GO TO MODE11; END;
143       IF S>78H THEN Q=07H;
144       IF S>96H THEN Q=03H;
145        IF S>0B4H THEN Q=01H;
146       IF S>0D3H THEN Q=00H;
147    IF LV>0CEH THEN RE=RE+2;
148    IF LV>0D4H THEN RE=RE+3;
149    IF LV>0DAH THEN RE=RE+4;
150    IF LV>0E0H THEN RE=RE+5;
151    IF LV>0E6H THEN Y=02H;
152     IF IO<30H THEN K=030H;
153     IF IO>80H THEN K=30H;
154     IF IO<80H AND TI<190H AND M1=1 THEN X=X+2;
155     IF IO<K   THEN DO; Y=Y+04H; TOS=0; END; ELSE DO;
156        TOS=TOS+1; IF TOS<2 THEN Y=Y+04H; IF TOS>8 THEN IC
157     IF LV>0FDH THEN Z1=1;
158     IF Z1=1 THEN DO;
159        X1=70H; Q=0; Y=0AH;       IR=2; END;
160     GO TO MODE11; END;
161   CYCBP: IF M=0 AND M0=1 THEN DO;
162       OUTPUT(1)=4AH; TS=TS+1; TI=0;
163       IF ((INPUT(4) AND 02H) =02H) AND (IR<99H) THEN Y=02H
164       IF IR<50H THEN Y=02;
165       IF PO<5 AND ((IO<3FH) OR (T>0F0H)) THEN DO;
166        X1=30H; X2=00H; END;
167     GO TO MODE11; END;
168   CYCPB: IF M=1 AND M0=0 THEN DO;
169       OUTPUT(1)=2AH; TP=2;
```

```
170        Z1=0;
171        IF IR<50H THEN Y=02;
172        IF P0<5 AND ((I0<3FH) OR (T>0F0H)) THEN DO;
173           X1=10H; X2=00H; END;
174        IF (T>0D8H) AND (I0>3FH) THEN DO;
175           X1=50H; X2=00H;END;
176        GO TO MODE11; END;
177  0AC0H: MODE11: OUTPUT(1)=08H;
178        OUTPUT(5)=(X+X1+X2);
179           GO TO MODE3;
180        EOF;
```

We claim:

1. In control apparatus for a chopper operative with a transit vehicle electric motor for determining the operation of said electric motor in one of a power mode and a brake mode, the combination of:
   means including a programmed digital apparatus for providing a digital signal for each of predetermined time intervals in response to a selected condition related to the operation of said motor, with said condition being the vehicle speed in the brake mode and being the phase angle of the chopper in the power mode;
   means for establishing for each said time interval when the signal has a predetermined relationship with a provided limit for a plurality of said time intervals;
   means operative with said establishing means for controlling the operation of said electric motor; and
   means for supplying to the digital signal providing means said selected condition for each said time interval.

2. The control apparatus of claim 1, with said condition being the speed of said vehicle and with said motor controlling means providing a controlled electric brake fade-out.

3. The control apparatus of claim 1, with said condition being the phase angle of said chopper and with said motor controlling means providing a field shunt change.

4. The control apparatus of claim 1, with said controlling means including means for changing the operational characteristic of said motor.

5. The control apparatus of claim 4, with said condition being the vehicle speed, and with said relationship including the difference between a first speed and a second speed in accordance with the operation of said transit vehicle.

6. The control apparatus of claim 4, with said changing means including at least one brake resistor;
   said controlling means determining the operation of said brake resistor with said motor to establish a predetermined electric brake effort provided by said motor.

7. The control apparatus of claim 4, with the motor operative in the power mode and with said changing means including at least one field shunt member;
   said controlling means determining the operation of said field shunt member with said motor to control the power effort provided by said motor.

8. The control apparatus of claim 1, with said digital apparatus including clock means for providing clock pulse signals to determine said time intervals; and
   with said establishing means being operative to count the clock pulse signal to determine said plurality of time intevals.

9. In the method of controlling the effort provided by a transit vehicle electric motor connected for operation with a chopper in one of power and brake modes, the steps of:
   supplying for each of predetermined time intervals an operational condition of said motor, with said condition being vehicle speed in the brake mode and being chopper phase angle in the power mode;
   providing a signal for each said time interval in response to said operational condition of the motor;
   establishing for each said time interval when the signal satisfies a predetermined relationship with a provided limit; and
   controlling an operation of the motor when the signal satisfies said relationship for a plurality of time intervals.

10. The method of claim 9, with said operational condition being the speed of the transit vehicle and with said motor being operative in a brake mode;
    said operation controlling step changing the electric brake effort provided by the motor.

11. The method of claim 9, with said operational condition being the phase angle of the chopper and with said motor being operative in the power mode;
    said operation controlling step changing the field shunt to determine the power effort provided by the motor.

12. The method of claim 9, with said operational condition being the phase angle of the chopper and with the provided limit being in accordance with a first phase angle of the chopper, and including the step of:
    establishing when the signal satisfies a second predetermined relationship with a second provided limit; and
    controlling a second operation of the motor when the signal satisfies the second relationship for longer than a second plurality of time intervals.

* * * * *